3,298,901
FORMATION OF BEATER SATURATED PRODUCTS USING A PARTIALLY CROSS-LINKED ACRYLIC LATEX BINDER AND PRODUCT THEREOF
Jay L. Piersol, East Hempfield Township, Lancaster County, Pa., assignor to Armstrong Cork Company, Lancaster, Pa., a corporation of Pennsylvania
No Drawing. Filed July 6, 1964, Ser. No. 380,655
7 Claims. (Cl. 162—168)

This invention relates generally to beater saturation, and more particularly to the improvement of tensile strength and flex-cracking resistance of products prepared by the beater saturation process. Still more particularly, the invention relates to improved beater saturated products having a cured, acrylic resin deposited on the fibers thereof to serve as a binder.

The beater saturation process imparts improved strength and other properties to the resulting sheets. Tensile strength is one of the most important properties of beater saturated sheets, particularly where flexibility and other desirable properties are maintained. Equally important is a high degree of flex-cracking resistance, particularly where the sheet is intended for use as a shoe material.

Accordingly, it is an object of the present invention to present a beater saturated sheet having improved tensile strength and flex-cracking resistance while maintaining flexibility and softness. It is another object of the present invention to present a process of beater saturating sheets with acrylic latices of defined type whereby surprising and unexpected improvements in tensile strength may be achieved.

These objects are accomplished in a surprisingly straightforward manner. The invention contemplates utilizing a curable acrylic latex having dangling carboxyl groups, amide groups, or mixtures thereof along the polymer backbone. Prior to depositing the latex on the fibers, there is added to the latex 0.5–5% by weight based on the dry weight of the latex of trimethoxy trimethoxymethyl melamine. The resulting mixture of latex and substituted melamine is heated to a temperature in the range of 150–200° F. for a period of time of one minute to one hour. This heating step results in a partial cure of the latex by means of the substituted melamine. The partially cured latex is then deposited on fibers in an aqueous suspension. A sheet or other product is formed from the resulting suspension of coated fibers by removal of water therefrom. Finally, the product is heated to a temperature in the range of about 200–300° F. for a period of time ranging from about five minutes to one hour.

The acrylic latices to be used in the present invention are those known and available latices of commerce. They are made of alkyl acrylates as the polymerizable monomer. The alkyl groups on these acrylates will range from 2 carbons to 8 carbons and include the ethyl acrylate to the 2-ethylhexyl acrylates. Mixtures of the alkyl acrylates are particularly desirable, a preferred mixture being of 50–80% by weight ethyl acrylate and 10–30% by weight butyl acrylate. In addition to the alkyl acrylates there will be added to the polymerizable monomers a relatively small percent, 1–5% by weight of all polymerizable monomers of acrylic acid, or methacrylic acid, or the amides thereof. A preferable mixture containing these reactive groups will contain 2½% by weight of the total of methacrylic acid and 2½% by weight of the total of methacrylamide. The mixture of polymerizable monomers are polymerized in known manner to form the acrylic latices of commerce. The solids content of such latices generally vary between about 30% and 50% by weight, although other concentrations may be utilized if desired.

The present invention calls for a partial precure of the acrylic latex. The precure must be accomplished, with the aid of heat, by a curable melamine-formaldehyde resin which is the partially methylated product of hexamethylol melamine. To preserve water solubility of the resin, methylation is only partially carried out, three of the hydroxyl hydrogens being replaced by the methyl groups, on the average. The formula for this substituted melamine to be used in the present invention may be stated to be

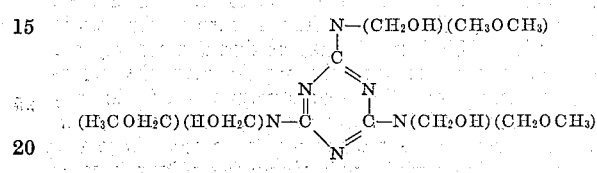

This substituted melamine may be identified as trimethylol trimethoxymethyl melamine. This substituted melamine is added to the acrylic latex described above in an amount of about 0.5–5% by weight based on the dry weight of the acrylic latex. The most convenient method of adding the substituted melamine is simply to add it in the form of a water solution. Normally, stirring would be accomplished to distribute the substituted melamine throughout the latex.

There then follows the critical heating step wherein the mixture of the acrylic latex and the substituted melamine is heated to a temperature in the range of about 150–200° F. for a period of time ranging from one minute to one hour, longer times being required at lower temperatures. This heating step partially precures or cross-links the acrylic latex, and does not precipitate the latex. It is this partially cross-linked acrylic polymer, still in the form of a stable latex, that is to be used in the present invention.

Once partial cross-linking has been accomplished, the partially cross-linked latex may be deposited on the fibers by any desired method. The fibers may be any of the papermaking fibers including cellulosic fibers such as kraft, rag, soda pulp, wood pulp, cotton linters, and the like. Mineral or inorganic fibers such as mineral wool or asbestos may also be used. The invention has particular application however to leather fibers, particularly chrome-tanned leather fibers, and the invention will be described with particular reference to leather fibers.

Any convenient technique may be used to deposit the acrylic latex on the fibers. Where the chrome-tanned leather fibers are used, the aqueous suspension of such fibers will normally contain sufficient chromium ions that the latex will deposit on the fibers over a period of 5–30 minutes with agitation. Alternatively, there may be used the alum-ammonia process fully described in U.S. Patent No. 2,375,245. Simple precipitation of the latex onto the fibers may often be accomplished by the mere addition of a solution of papermakers' alum to the fiber suspension containing the partially cured acrylic latex.

The amount of latex to be deposited on the fibers will vary depending on the end use of the product. Amounts of the latex may range from 10% based on the dry weight of the fibers to 150%. Costs and other economics of the operation, consistent with desired properties, will generally control the amount of latex deposited on the fibers.

Exceptional properties in leather sheets are obtained using 100% by weight of the latex based on the dry weight of the leather fibers.

Once the partially cured acrylic latex has been deposited on the fibers, a sheet or other product may be formed in the usual manner. Water may be removed from the fiber suspension by means of a Fourdrinier wire, a cylinder, a mold, or by any of the usual sheet-forming means. After water removal, the product will be dried in normal manner to remove all or most of the water therefrom. The usual drying operations will be employed, and these remove water from the web or other product to the extent of bone dry to about 10% by weight water.

Subsequent to the drying operation, the resulting sheet or board product will be subjected to an additional heat treatment at a temperature in the range of 200–300° F. for a period of time of from about five minutes to one hour, longer times being employed at the lower temperatures. This heating step is also a critical part of the invention and it must be emphasized that the heating step is in addition to the normal drying steps. The heating step apparently allows the additional cure of the acrylic latex while on the fiber. It may be that this heating step promotes reaction between the acrylic latex, the substituted melamine, and the fiber structure itself. In any case, as a result of the entire process, extraordinary tensile strengths and flex-cracking resistance are achieved in the resulting sheets while maintaining flexibility and other desired properties in the sheet.

It is an unexplained feature of the present invention that the substituted melamine must be incorporated into the system as described and not in some other way. For example, the substituted melamine may not be added to the wet web after it has been beater saturated with the acrylic latex. Nor may the substituted melamine be added directly to the fiber before the deposition thereon of the acrylic latex. Only by deposition onto the fibers of the partially cured latex will the unexpected results of the present invention be achieved.

The following examples illustrate several embodiments of the invention. All parts are by weight unless otherwise stated.

*Example 1*

To an acrylic latex made by polymerizing a mixture of ethyl acrylate, butyl acrylate, and 2.5% by weight each of methacrylic acid and methacrylamide was added trimethylol trimethoxymethyl melamine. The latex was used in an amount of 57.7 parts having a solids content of 43.9%. The substituted melamine was used in an amount of 0.63 part as an 80% solution in water. The mixture was heated to 185° F. for 10 minutes and was then added to 25.3 parts of chrome-tanned leather fiber in 2880 parts of water. The latex precipitated on the leather fibers with no more than gentle stirring.

The resulting beater saturated sheet was dried at 190° F. and then was subsequently given a heat treatment of 250° F. for 30 minutes.

The tensile strength of the resulting sheet in pounds per square inch was 3930.

*Example 2*

A series of runs was made in which, aside from the control, the substituted melamine was introduced into the process in the manner described below. All steps, ingredients, and amounts of ingredients were identical with those of Example 1, save for the method of adding the substitute melamine. These runs were made to contrast the tensile strength of the resulting sheets with the tensile strength achieved in Example 1.

| Sheet No. | Method for Adding Substituted Melamine | Tensile Strength, Lbs./Sq. Inch |
| --- | --- | --- |
| 2,706 | Control—no substituted melamine | 2,800 |
| 2,707 | Substituted melamine painted on wet sheet. | 3,266 |
| 2,708 | Sheet submerged in substituted melamine, three hours. | 2,961 |
| 2,709 | Substituted melamine applied directly to fiber before latex. | 2,966 |
| 2,710 | Substituted melamine added to latex in the cold, no heating to precure. | 3,025 |
| 2,712 | Substituted melamine added to latex and precured as described in Example 1. | 3,930 |

Improvement in flex-cracking resistance was as follows:

Sheet No.:                                                         M.I.T. folds to failure
2706                                                          4,667–5,604
2712                                                          18,398–21,784

I claim:
1. In the deposition of an acrylic latex on fibers in aqueous suspension in a beater saturation process, said latex being a curable acrylic latex containing groups selected from the group consisting of carboxyl groups, amide groups, and mixtures thereof distributed along the polymeric backbone, the method of improving the strength and flex-cracking resistance of the water-laid product which comprises adding to said latex 0.5–5% by weight based on the dry weight of said latex of trimethylol trimethoxymethyl melamine, heating the resulting mixture to a temperature in the range of 150–200° F. for a period of time ranging from one minute to one hour to partially cross-link said latex, depositing the partially cross-linked latex on papermaking fibers in aqueous suspension, forming a product from the resulting coated fibers, drying the product, and heating the product to a temperature in the range of 200–300° F. for a period of time of from about five minutes to one hour to completely cure the latex.

2. The method according to claim 1 in which said acrylic latex is a mixture of polymerized ethyl acrylate, butyl acrylate, and having cross-linking sites in the form of carboxylic acid groups and amide groups distributed along the polymeric backbone.

3. The method according to claim 1 wherein said melamine is added in an amount of about 2% by weight based on the dry weight of said latex.

4. A method according to claim 1 wherein said temperature to partially cross-link said latex is 185° F.

5. A method according to claim 1 wherein said temperature for heating said product is 250° F.

6. A water-laid, beater saturated sheet of papermaking fibers coated with a binder, the binder consisting essentially of an acrylic latex cross-linked with 0.5–5% by weight based on the dry weight of said latex of a trimethoxymethyl trimethylol melamine, said latex being a curable acrylic latex containing groups selected from the group consisting of carboxyl groups, amide groups, and mixtures thereof distributed along the polymeric backbone.

7. A sheet according to claim 6 wherein said cross-linked latex is present in an amount of 100% by weight based on the dry weight of the fibers.

References Cited by the Examiner
UNITED STATES PATENTS
2,905,584    9/1959    Dunlap _____ 162—166 X
3,068,121    12/1962    Weschler _____ 162—166 X DONALL H. SYLVESTER, *Primary Examiner.*
S. LEON BASHORE, *Examiner.*